United States Patent
Koneval et al.

(10) Patent No.: US 7,287,803 B2
(45) Date of Patent: Oct. 30, 2007

(54) ROTATING CABLE TAILGATE ACTUATOR

(75) Inventors: Kevin R. Koneval, Macomb Township, MI (US); Favad Shah, Clinton Township, MI (US); Heather Golen, Linden, MI (US); Jay Sypen, Howell, MI (US); Fred Eberle, Lake Orion, MI (US)

(73) Assignee: Hi-Lex Corporation, Troy, MI (US)

( * ) Notice: Subject to any disclaimer, the term of this patent is extended or adjusted under 35 U.S.C. 154(b) by 22 days.

(21) Appl. No.: 11/296,930

(22) Filed: Dec. 8, 2005

(65) Prior Publication Data

US 2007/0132264 A1 Jun. 14, 2007

(51) Int. Cl.
*B60J 5/00* (2006.01)
*B62D 33/03* (2006.01)
(52) U.S. Cl. .................. 296/146.4; 296/57.1; 296/106
(58) Field of Classification Search ............... 296/57.1, 296/106, 146.4
See application file for complete search history.

(56) References Cited

U.S. PATENT DOCUMENTS

| | | | | |
|---|---|---|---|---|
| 2,893,727 A | * | 9/1959 | Barnard | .......................... 49/98 |
| 3,916,276 A | * | 10/1975 | Ottoson | ........................ 318/269 |
| 5,449,212 A | * | 9/1995 | Seifert | ....................... 296/57.1 |
| 5,782,038 A | | 7/1998 | Sponable et al. | |
| 5,784,833 A | | 7/1998 | Sponable et al. | |
| 6,068,321 A | * | 5/2000 | Ooms | ......................... 296/57.1 |
| 6,217,097 B1 | * | 4/2001 | Rogers et al. | ............. 296/57.1 |
| 6,324,788 B1 | | 12/2001 | Koneval et al. | |
| 6,357,813 B1 | * | 3/2002 | Vandeberghe et al. | ...... 296/57.1 |
| 6,516,567 B1 | | 2/2003 | Stone et al. | |
| 6,553,719 B1 | | 4/2003 | Stone et al. | |
| 6,994,390 B2 | * | 2/2006 | Zagoroff | ..................... 296/57.1 |

* cited by examiner

*Primary Examiner*—Dennis H. Pedder
(74) *Attorney, Agent, or Firm*—Brinks Hofer Gilson & Lione

(57) ABSTRACT

A power actuator for moving automotive closure panels between opened and closed positions. The actuator is particularly adapted for actuating the rear tailgate of a pickup truck type vehicle and includes an electric drive motor, a flexible cable assembly, and a strut assembly coupled to the hinge of the tailgate. Electrical control signals are applied to cause the opening and closing motion upon appropriate input electrical signals from vehicle mounted switches. The actuator assembly provides controlled opening rotational rate of the tailgate against the force of gravity through the application of a reduced electrical power level applied to the motor by a separate power source or by shunting the motor to an electrodynamic braking effect. Closing of the tailgate is caused by applying full power to the electric motor. The invention also involves the design of a hinge assembly which efficiently transfers torque between the vehicle body and closure panel, while allowing serviceability of the closure panel.

20 Claims, 5 Drawing Sheets

ROTATING CABLE TAILGATE ACTUATOR

FIELD OF THE INVENTION

This invention relates to an actuator assembly for automotive applications, and in particular, to such an assembly designed for moving a motor vehicle closure panel between opened and closed positions. In a preferred embodiment, the actuator assembly of the present invention is used to open and close the tailgate of a pickup truck type motor vehicle.

BACKGROUND AND SUMMARY OF THE INVENTION

Motor vehicles are increasingly provided with convenience features to provide powered opening and closing of closure panels. Examples include rear hatches and lift gates of van and SUV type vehicles. Similarly, sliding doors of full size vans and mini-van type vehicles are now often provided with power actuators.

Numerous designs of presently available products are used to provide such closure panel actuation. Examples of such systems are described by the assignees commonly owned U.S. Pat. Nos. 6,516,567; 5,784,833; 5,782,038; 6,553,719 and 6,324,788, which are hereby incorporated by reference. Several of these patents describe devices incorporating an electric motor actuator which transmits driving torque through a flexible cable to a lead screw type actuator unit. Through controlled rotation of the electric motor, opening and closing of the closure panel is provided.

In addition to closure panels designed for allowing occupant ingress and egress for the vehicle, movable windows may also be power actuated. In addition to power window regulators which raise and lower door glass, flip-out vent windows, pick-up truck cab rear windows, or sail panel windows may also be provided with power actuators.

The rear tailgates of pickup truck type motor vehicles have generally not been provided with power actuators for opening and closing the tailgates. However, increases in the strength and features integrated into pickup truck tailgates have led to their becoming increasingly heavy. Also, in the effort to make opening and closing of pickup truck tailgates convenient for a broad range of motor vehicle users, there is increasing interest in providing power actuation for pickup truck tailgates.

The incorporation of power actuation for pickup truck tailgates and other motor vehicle closure panels should preferably be provided in a manner which enables convenient packaging of the actuator into the vehicle and further does not negatively affect manufacturability and servicing of the vehicle. It is further preferred to provide power actuation for existing designs of vehicles without requiring substantial reworking and redesign of the vehicle structure.

SUMMARY OF THE INVENTION

The power actuator assembly in accordance with the present invention may be used for actuating various motor vehicle closure panels, but is especially implemented in the preferred embodiment to open and close a pickup truck tailgate.

When opening and closing certain closure panels, such as a pickup truck tailgate, very different forces act on the tailgate and the actuator during the opening and closing motion. Since a pickup truck tailgate is hinged at its lower edge and raised between a generally horizontal open position to a vertical closed position, it is necessary to lift against the weight of the tailgate when closing it from the open position. Conversely, when the tailgate is dropped from its closed to the open position, the force of gravity urges the tailgate to move to the open position. A power actuator preferably will control the speed of the opening and closing movements of the tailgate. The actuator assembly in accordance with the present invention incorporates features to provide such controlled motion in both directions of movement of the tailgate.

Another aspect of the present invention is a hinge system particularly adapted for use with a pickup truck tailgate while providing power actuation features. The hinge system efficiently transfer the driving torque of the actuator to the rear tailgate and further enables convenient assembly and servicing of the tailgate.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
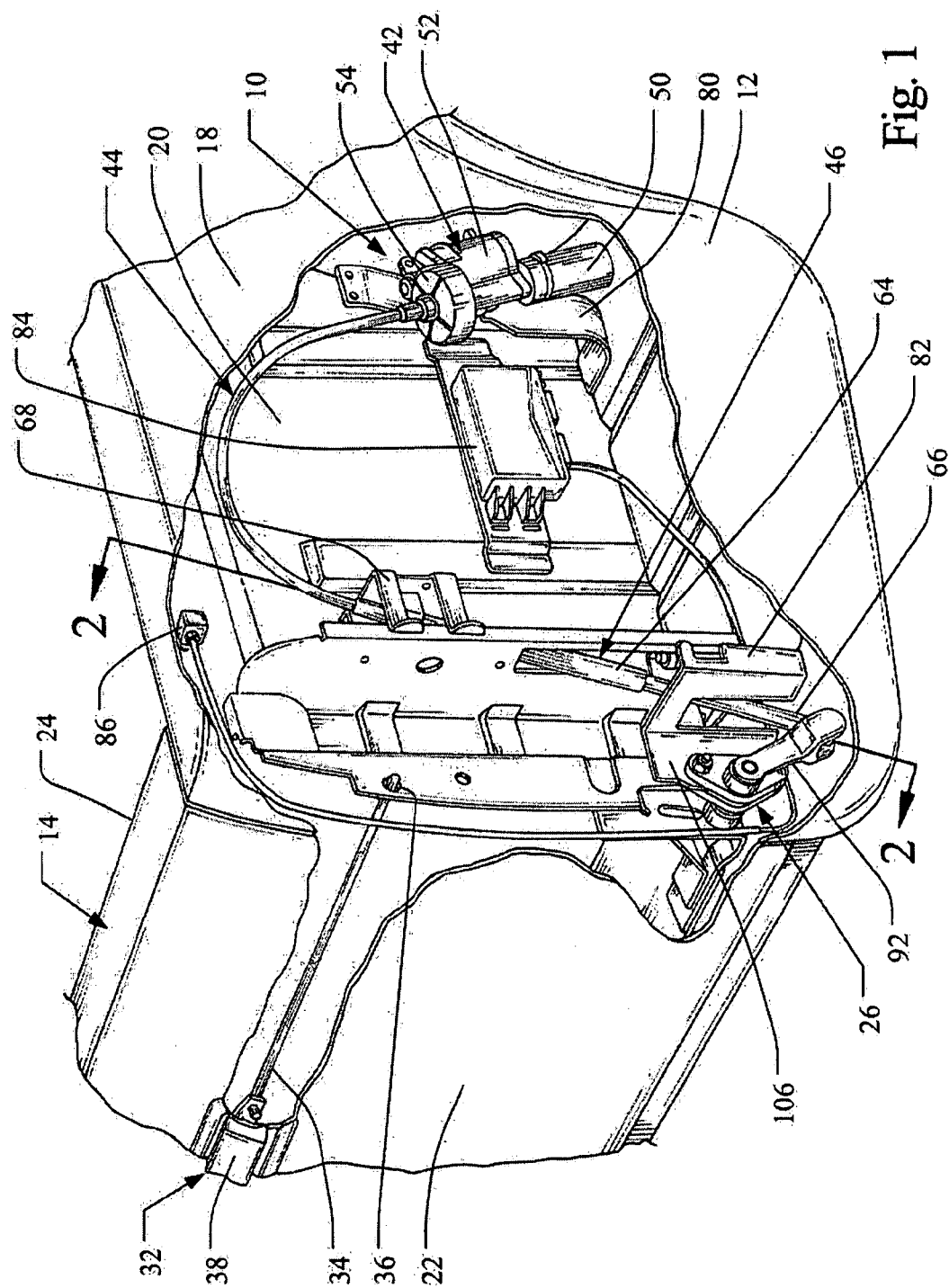
FIG. 1 is a pictorial view of the rear corner area of a pickup truck type motor vehicle shown in a partially cut-away form and showing the actuator assembly in accordance with the present invention.

With particular reference to FIG. 1, an actuator assembly in accordance with this invention is shown and generally designated by reference number 10. Actuator assembly 10 is shown installed in a pickup truck type motor vehicle including bed side 12, tailgate 14, and bed load floor 16. Bed side 14 forms a hollow interior cavity between outer side sheet metal skin 18 and inner side panel 20. Similarly, tailgate 14 is formed from welded or bonded together sheet metal panels including outer and inner tailgate panels 22 and 24, respectively.

Figure 3:
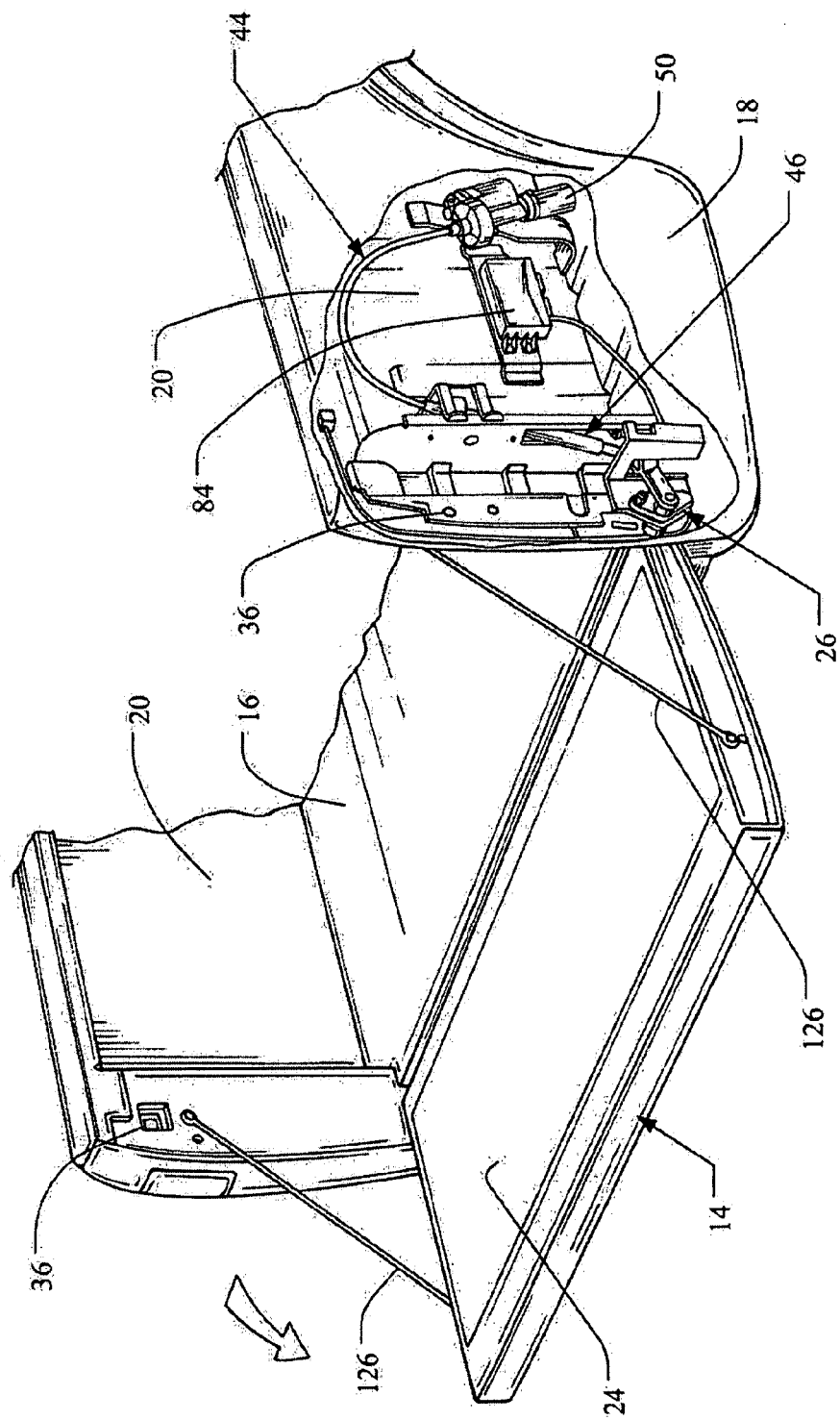
FIG. 3 is pictorial view similar to FIG. 1, but showing the rear tailgate in its open position.
Figure 4:
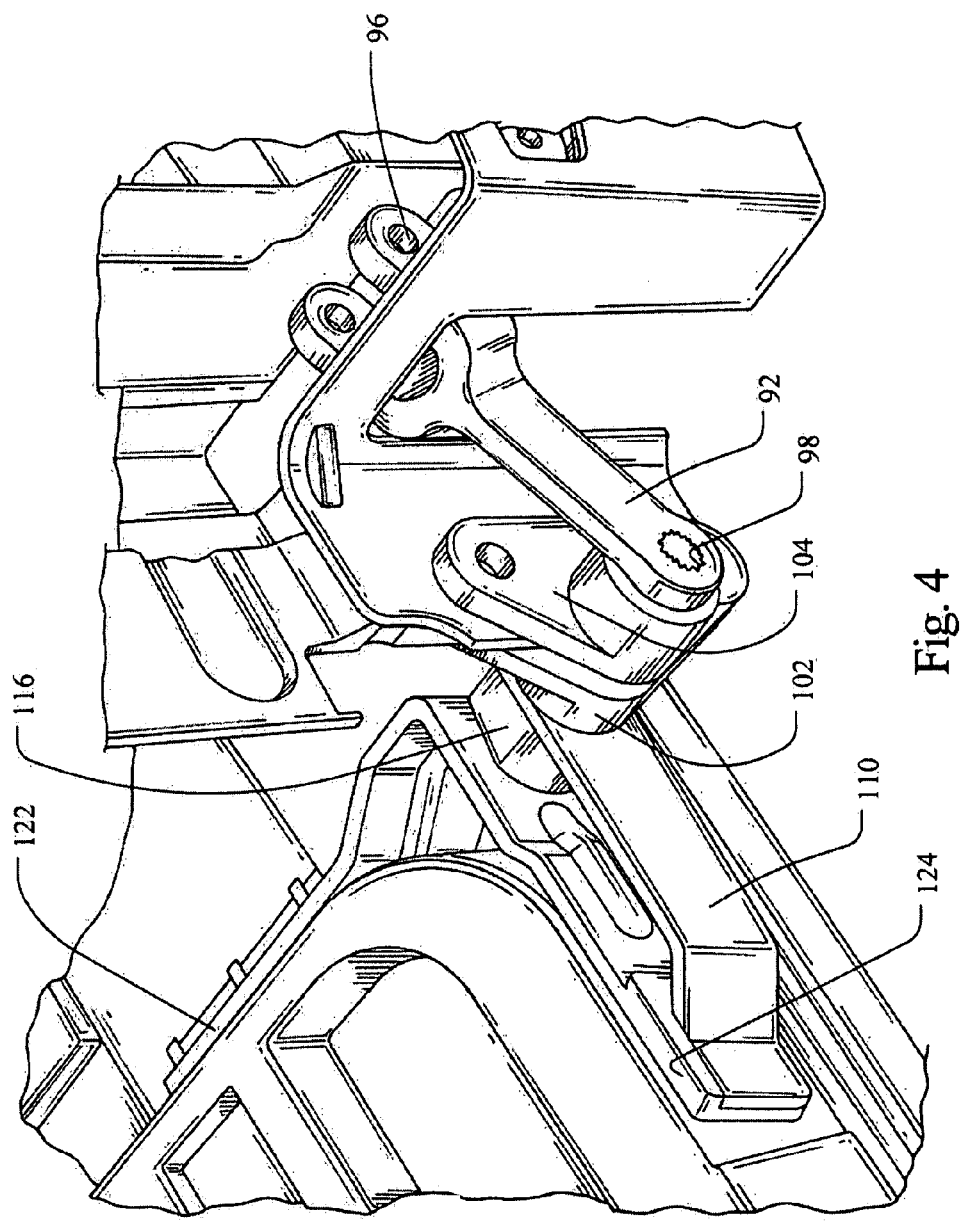
FIG. 4 is an enlarged pictorial view taken from FIG. 3 showing in greater detail the components of the tailgate hinge assembly of the present invention.
Figure 5:
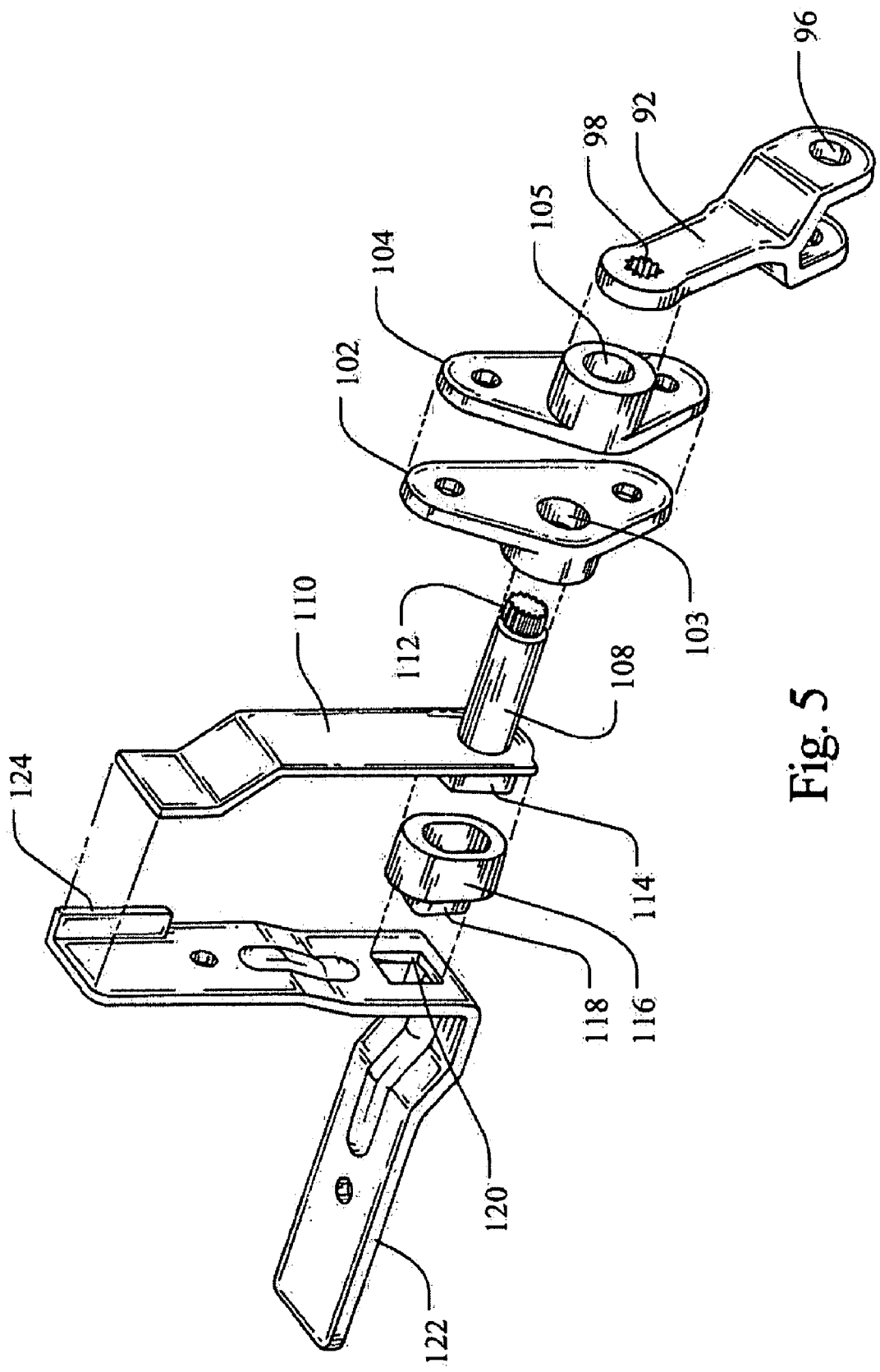
FIG. 5 is an exploded view of the hinge assembly shown in FIG. 4.

Tailgate 14 is pivotable about hinge assembly 26 between its generally vertical closed position shown in FIG. 1 to an open generally horizontal position as shown in FIG. 3. FIGS. 4 and 5 provide more illustrations of the hinge assembly 26, described in more detail below.

Tailgate latch assembly 32 is provided for latching the tailgate 14 in its closed locked position. As shown, latch assembly 32 includes a laterally projecting latch rod 34 which engages with receiving socket 36 formed by bed side 12. Latch assembly 32 further includes latch handle 38 which, when grasped and lifted, pulls latch rod 34 from its engagement with socket 36 to enable the tailgate 14 to be moved from its closed position, to its open position. Except for details of hinge assembly 26, the previously described components are generally of conventional configurations and are found in motor vehicle pickup truck tailgate assemblies which are manually operated.

In accordance with a principal feature of the present invention, actuator assembly 10 is provided to enable powered movement of tailgate 14 between its opened and closed positions. Actuator assembly principally comprises electric motor actuator 42, flexible torsional cable assembly 44, and strut assembly 46.

Electric motor actuator 42 includes electric motor 50 which is coupled to flexible torsional cable assembly 44 through transmission 52 and clutch assembly 54. Transmission assembly 52 provides the desired gear reduction between the rotational speed of the rotating armature of electric motor 50 and the desired rotational speed and torque to be delivered to flexible torsional cable assembly 44. Clutch assembly 54 is provided to enable electric motor 50 to be selectively coupled and decoupled from cable assembly 44. Clutch assembly 54 couples the transmission 52 to the cable assembly 44 when the motor 50 is energized, and decouples while the motor is not powered. In another configuration of clutch assembly 54, the clutch"grounds" the rotation of cable assembly 44 to assert motion of the tailgate 14. The transmission 52, clutch assembly 54 and strut assembly form a force transmission assembly for converting rotational movement of motor 50 to motion of tailgate 14. Although flexible cable assembly 44 is described, it is within the scope of this invention to provide a rigid coupling between the components by eliminating the flexible cable. Moreover, other mechanical linkages may be provided for coupling motor 50 to the tailgate 14, such as linear drives, pulley arrangements and equivalent systems.

Flexible torsional cable assembly 44 includes a non-rotating outer casing 60 and an inner rotatable core 62. Flexible torsional cable assembly 44 provides the ability to mount electric motor actuator 42 remotely from strut assembly 46, thus increasing packaging and mounting flexibility.

Figure 2:
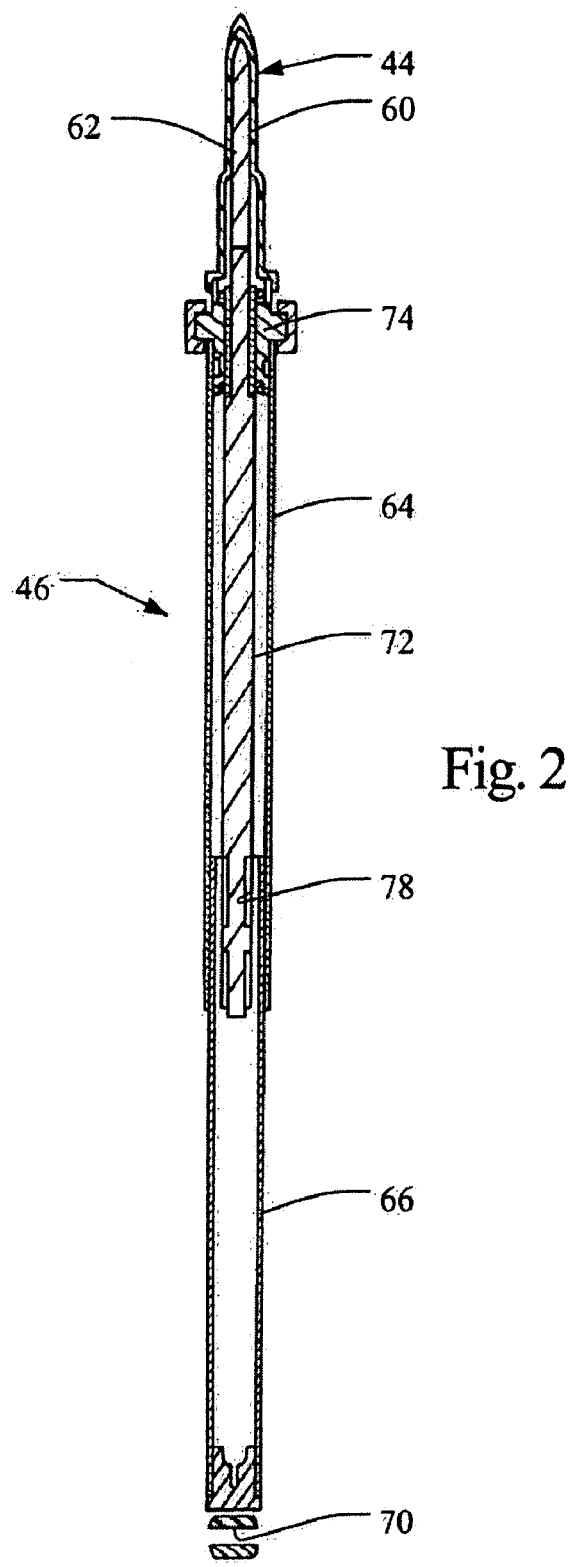
FIG. 2 is a cross-sectional view taken along line 2-2 of FIG. 1 showing the internal construction of the strut assembly component of the present invention.

Strut assembly 46 includes tubular housing 64 and extendible tube 66. Strut housing 64 is mounted to the vehicle by vehicle mounting bracket 68. The end of tube 66 protruding from housing 64 includes through bore 70 for mounting to hinge assembly 26. FIG. 2 provides additional detail of the internal construction of strut assembly 46. As shown in that figure, flexible cable inner core 62 is coupled with rotatable screw rod 72. Screw rod 72 is maintained in position within housing 64 by bushings 74. Rotation of cable core 62 causes screw rod 72 to rotate within bushing 74. Nut 78 meshes with the threads of screw rod 72 and is fixed to tube 66. When tube 66 is attached to clevis arm 92 of hinge assembly 26, it cannot rotate and therefore rotation of cable inner core 62 causes the position of nut 78 to change along the length of screw rod 72. This action causes retraction and extension of tube 66 from housing 64. This motion is coupled to the tailgate 14 via clevis arm 92 and hinge assembly 26 to cause it to move between its opened and closed positions.

FIG. 1 illustrates the mounting of electric motor actuator 42 within the internal cavity formed by vehicle bed side 12. Electric motor actuator 26 is mounted to the vehicle structure via bracket 80. Flexible torsional cable assembly 44 is routed through the internal cavity of bed side 12 to connect with strut assembly 46 as previously described. Strut assembly 46 passes through end panel 82 such that tube 66 engages with hinge assembly 26. Electronic control unit (ECU) controller 84 applies electrical power to electric motor actuator 42 to cause it to undergo the desired actuation. ECU controller is coupled with the vehicle's power bus and further receives signals from one or more sensors and switches used in connection with actuator assembly 10. Tailgate close switch 86 is conveniently positioned for access by the vehicle operator near tailgate 14 and is electrically connected with ECU controller 84.

Now with reference to FIGS. 4 and 5, additional details of the components comprising hinge assembly 26 are illustrated. Hinge assembly 26 includes extending clevis arm 92 which has a clevis attachment arrangement for receiving a pin (not shown) which passes through clevis arms 96 and tube 66 through bore 70. The opposite end of clevis arm 92 forms an internally splined bore 96. A pair of inner and outer support brackets 102 and 104 are provided which each include an internal passageway for receiving pressed-in bearing sleeves 103 and 105, respectively. Support brackets 102 and 104 are mounted via their mounting flanges to panel 106 which is part of the pickup truck bed side structure.

Hinge drive shaft 108 passes through the bearing sleeves 103 and 105 of inner and outer support brackets 102 and 104 and forms a protruding splined end which matches with the splined bore 98 of clevis arm 92 to enable torsional forces to be transferred between these components. Lever arm 110 is attached near an end of drive shaft 108 and is preferably welded or otherwise bonded to the driveshaft. On the end of driveshaft 108 opposite spline 112, drive head 114 is formed. Drive head 114 fits within a socket of drive cup 116 which in turn includes a protruding head 118 which fits within a similarly shaped aperture 120 of tailgate bracket 122. Tailgate bracket 122 and drive cup 116 are preferably affixed to one another, for example by welding or an interference fit. Bracket 122 is fastened to tailgate 14 using suitable fasteners.

FIG. 4 illustrates hinge assembly 26 mounted to the vehicle and shows the engagement between driveshaft lever arm 110 and tailgate bracket 122 which includes a projecting flange 124 which engages with lever arm 110. FIG. 4 also illustrates the orientation of bracket 122 in its connection with tailgate 14. The interaction between tailgate bracket 122 and driveshaft lever arm 110 allows tosional loads exerted by actuator assembly 10 to be coupled to tailgate 14 without imposing excessive localized stresses on the tailgate or components of hinge assembly 26. This arrangement of hinge assembly 26 allows portions of the hinge assembly to be disassembled to permit installation and removal of the tailgate 14 since drive cup 116 and lever arm 110 can be decoupled from the tailgate by pulling both components away from their engagement with tailgate bracket 122.

Once the entire hinge assembly 26 is assembled to the tailgate 14, it is still easily removable. During such servicing steps, the tailgate 14 would be removed by detaching the fasteners used for affixing tailgate bracket 122 to the tailgate. Thereafter, clevis arm 92 may be removed from driveshaft 108, allowing the driveshaft to slide out from its support bushings and removed. The support brackets 102 and 104 may also be removed by removing the associated fasteners.

In operation of actuator assembly 10, extension of strut tube 66 exerts a downward force of clevis arm 92 which closes tailgate 14 from its opened to its closed position. Conversely, opening of the tailgate from its closed position causes rotation of the clevis arm 92 and retraction of strut tube 66.

In accordance with a principal feature of the present invention, ECU controller 84 provides controlling functions for actuator assembly 10. When tailgate 14 is in its closed position, as shown in FIG. 1, when it is desired to open the tailgate, the operator engages latch handle 38 begins to move the tailgate open. This motion drives motor 50 to rotate, which provides a motor armature housing and input to ECU controller 84. In some implementations of this invention, a position encoder may be incorporated into clutch assembly 54 to provide output of cable rotation whether or not the clutch is engaged. In the "opening" mode of operation, ECU controller 84 then applies an average power to the electric motor which is less than the higher power level used to lift the tailgate, as will be described in more detail below. This reduced power may be provided by a reduced DC constant voltage application to motor 50 or by a chopped or pulse width modulated higher level voltage having a reduced effective level. Moreover, this applied power for providing a braking effect can be provided by "shunting' the motor power leads, in effect creating a braking effect through electrical potential generated by driven rotation of the motor. In the case of such motor shunting, the generated electrical potential is proportional to the motor speed, and therefore the braking effect is dynamically varied. In any case however, the reduced power level is less than that needed to positively drive tailgate 14 to the down or opened position and acts to provide a braking effect.

It has been found that energizing electric motor 50 to a reduced power level, enables the motor to exert an electrodynamic braking effect when it is "over driven", or driven by the tailgate motion.

The weight of tailgate 14 and it being hinged at its lower edge results in there not being a need for power actuation to open the tailgate. However, a means for slowing its opening operation is desired. The gravity forces acting on tailgate 14, urging it to the opened position, are transmitted through strut assembly 46 and causes rotation of cable core 62 and the rotating armature of the electric motor 50 acting through clutch assembly 54 and transmission 52. The electodynamic braking effect provided by the electric motor 50 slows the downward motion of the tailgate. This is desirable to produce a controlled opening motion rather than simply allowing the tailgate 14 to drop under its own weight.

Once tailgate 14 reaches its full opened position, it reaches the horizontal position which is mechanically limited by cables 126. ECU controller 84 de-energizes the electric motor 50 once a predetermined number of rotations of the motor armature occurs. Electric motor 50 includes well known features to output its rotational position, which can be achieved by electrical artifacts resulting from rotation of the armature, or by an integrated shaft encoder, such as conventional Hall effect devices. Moreover, as mentioned previously, the rotation signal may also be produced by clutch assembly 54.

When the operator desires to move the tailgate 14 from its opened to closed position, close switch 86 is actuated which sends a control signal to ECU controller which applies full power to be applied to electric motor 50 to cause it to rotate in a direction to cause extension of strut assembly 46. The electrical power applied to electric motor 50 in this mode of operation is a full power level associated with the desired average voltage to produce the desired tailgate closing torque acting on hinge assembly 26. The average electrical power applied in this mode of operation is referred to as the full power application. The electodynamic braking effect produced when lowering the tailgate 14 causes the application of a reduced average power applied to the electric motor 50 (or by self generated power by shunting the motor, as described previously). The reduced power level is preferably significantly less than the full power level. For reference, full power may be provided by application to motor 50 about 12-13 VDC, equivalent to battery power on the vehicle electrical supply bus. For such vehicles, the reduced power level may be provided by applying to motor 50 voltage in the range of 4-8 VDC in applied externally, or by the power generated through shunting of the motor. Another approach to modulate power is to control electrical current applied to motor 50 in a manner which provides two or more power levels, as described previously.

In the mode of closing tailgate 14, actuator assembly 10 will raise the tailgate until it reaches a position where latch assembly 32 engages with bed side 12. At this position, the current to electric motor 50 is interrupted.

It is contemplated that several types of latch assemblies 32 may be used in connection with this invention. In a conventional latch, tailgate 14 moves directly to its final latched position. In so-called cinching-type latches, a secondary, partially opened position is reached at which point the latch assembly includes a mechanism for powered cinching of the tailgate 14 to a fully closed and locked position. In the case of a cinching-type lock, actuator assembly 10 may be de-energized once the secondary position is reached, providing for final movement under the operation of the cinching latch unit.

Power actuated closure panels for motor vehicles typically require a so-called anti-pinch features which causes the powered actuator to stop or reverse operation when the closure panel hits an obstacle. For example, if the tailgate 14 encounters and obstacle in its opening movement, an increase in load on electric motor 50 is detected through monitoring current or other electrical parameters acting on the electric motor. ECU controller 84 then will either interrupt the application of power to the motor or reverse polarity to move the tailgate in the opposite position, away from the obstacle. A similar operation occurs in the tailgate closing direction of movement.

While the above description constitutes the preferred embodiment of the present invention, it will be appreciated that the invention is susceptible to modification, variation and change without departing from the proper scope and fair meaning of the accompanying claims.

The invention claimed is:

1. An actuator assembly for controlling the motion of a motor vehicle closure panel between a first position and a second position of the type in which the force of gravity assists in urging the panel to move in a first direction from the first position to the second position and the force of gravity opposes movement of the panel while moving in a second direction from the second position to the first position, the actuator assembly comprising:
   an electric motor rotatable in first and second opposing rotational directions,
   a force transmission assembly coupled with the electric motor such that the closure panel is caused to move between the first position and the second position by rotation of the electric motor, and
   an electrical controller for applying electrical power to the electric motor applying a first average electrical power level to the motor causing the motor to move the panel in the second direction and causing a second average electrical power level to be applied to the motor causing the motor to move the panel in the first direction and causing the motor to provide an electrodynamic braking effect in controlling the rate of movement of the panel in the first direction.

2. An actuator assembly according to claim 1, wherein the first average electrical power is a full average power, and the second average power is a reduced average power which is less than the full average power.

3. An actuator assembly according to claim 1, wherein the second average power is applied by the electrical controller.

4. An actuator assembly according to claim 1 wherein the second average power is applied by shunting the motor.

5. An actuator assembly according to claim 1, wherein the closure panel is pivotable about a generally horizontal axis.

6. An actuator assembly according to claim 5 wherein the force transmission assembly is coupled to the closure panel at a hinge assembly positioned on the horizontal axis.

7. An actuator assembly according to claim 5, wherein the closure panel comprises a rear bed tailgate for a pick-up truck type motor vehicle and the tailgate is in a generally vertical closed orientation in the first position and the tailgate is in a generally horizontal open orientation in the second position.

8. An actuator assembly according to claim 7, further comprising an arm coupled with the tailgate and the force transmission assembly.

9. An actuator assembly according to claim 1, further comprising a flexible cable coupling the motor with the closure panel through the force transmission assembly.

10. An actuator assembly according to claim 2, further comprising the full average electrical power level being provided by applying an average voltage of greater than 12 volts DC to the motor.

11. An actuator assembly according to claim 2, further comprising the reduced electrical being provided by applying an average voltage of less than 12 volts DC to the motor.

12. An actuator assembly for controlling the motion of a motor vehicle closure panel between a first position and a second position in which the force of gravity assists in urging the panel to move in a first direction from the first position to the second position and the force of gravity opposes movement of the panel while moving in a second direction from the second position to the first position, comprising:

a hinge assembly providing movement of the panel about a hinge axis between the first and second positions, an electric motor rotatable in first and second opposing rotational directions, a lead screw assembly coupled with the electric motor and having an extendable tube moveable in a generally linear direction between a retracted position caused by the motor rotating in the first rotational direction and an extended position caused by the motor rotating in the second rotational direction, the lead screw coupled with the panel through the hinge assembly to control the motion of the panel to move between the first position and the second position, and an electrical controller for applying electrical power to the electric motor applying a full average electrical power level to the motor causing the motor to move the panel in the second direction and applying a reduced average electrical power level to the motor causing the motor to move the panel in the first direction and causing the motor to provide an electrodynamic braking effect in controlling the rate of movement of the panel in the first direction, and wherein the reduced average electrical power is less than the full average electrical power.

13. An actuator assembly according to claim 12, wherein the reduced average power is applied by the electrical controller.

14. An actuator assembly according to claim 12, wherein the reduced average power is applied by shunting the motor.

15. An actuator assembly according to claim 12, wherein the closure panel is pivotable about a generally horizontal axis.

16. An actuator assembly according to claim 15, wherein the closure panel comprises a rear bed tailgate for a pick-up truck type motor vehicle and the tailgate is in a generally vertical closed orientation in the first position and tailgate is in a generally horizontal open orientation in the second position.

17. An actuator assembly according to claim 16, further comprising an arm coupled with the tailgate and the actuator tube.

18. An actuator assembly according to claim 12, further comprising a flexible cable coupling the motor with the closure panel.

19. An actuator assembly according to claim 12, further comprising the full average electrical power level being provided by applying an average voltage of greater than 12 volts DC to the motor.

20. An actuator assembly according to claim 12, further comprising the reduced electrical being provided by applying an average voltage of less than 12 volts DC to the motor.

* * * * *